US010710023B2

(12) United States Patent
Yanagawa et al.

(10) Patent No.: US 10,710,023 B2
(45) Date of Patent: Jul. 14, 2020

(54) EXHAUST GAS PURIFICATION CATALYST

(71) Applicant: CATALER CORPORATION, Kakegawa-shi, Shizuoka (JP)

(72) Inventors: Koki Yanagawa, Kakegawa (JP); Satoshi Matsueda, Kakegawa (JP); Yu Sakurada, Kakegawa (JP); Chihiro Kasuya, Kakegawa (JP)

(73) Assignee: CATALER CORPORATION, Shizuoka (JP)

( * ) Notice: Subject to any disclaimer, the term of this patent is extended or adjusted under 35 U.S.C. 154(b) by 71 days.

(21) Appl. No.: 16/078,082

(22) PCT Filed: Feb. 23, 2017

(86) PCT No.: PCT/JP2017/006934
§ 371 (c)(1),
(2) Date: Aug. 21, 2018

(87) PCT Pub. No.: WO2017/150350
PCT Pub. Date: Sep. 8, 2017

(65) Prior Publication Data
US 2019/0083931 A1 Mar. 21, 2019

(30) Foreign Application Priority Data
Mar. 1, 2016 (JP) .................................. 2016-039005

(51) Int. Cl.
*F01N 3/20* (2006.01)
*B01D 53/94* (2006.01)
(Continued)

(52) U.S. Cl.
CPC ....... *B01D 53/9409* (2013.01); *B01D 53/945* (2013.01); *B01J 27/053* (2013.01);
(Continued)

(58) Field of Classification Search
CPC .......... B01D 53/9409; B01D 2258/014; B01D 2255/1023; B01D 53/945; F01N 3/101;
(Continued)

(56) References Cited

U.S. PATENT DOCUMENTS

| 4,927,799 A | 5/1990 | Matsumoto et al. |
| 4,957,896 A | 9/1990 | Matsumoto et al. |

(Continued)

FOREIGN PATENT DOCUMENTS

| EP | 2368630 A1 | 9/2011 |
| EP | 2808081 A1 | 12/2014 |

(Continued)

OTHER PUBLICATIONS

May 23, 2017 International Search Report issued in International Patent Application No. PCT/JP2017/006934.
(Continued)

*Primary Examiner* — Matthew T Larg
(74) *Attorney, Agent, or Firm* — Oliff PLC

(57) ABSTRACT

An exhaust gas purification catalyst, characterized by having a catalyst layer containing palladium, rhodium, and alumina, which supports a sulfate of an alkaline-earth metal selected from barium sulfate and strontium sulfate, and the correlation coefficients $\rho_{Pd,AE}$ and $\rho_{Rh,AE}$ calculated from the characteristic X-ray intensity measured using an electron beam micro-analyzer for the palladium, rhodium, and alkaline-earth metal being +0.75 to +1.00 and 0.00 to +0.25, respectively, using 350 points as measurement points obtained by equally dividing the catalyst layer into 351 parts in the thickness direction on a virtual straight line that runs through the catalyst layer in the thickness direction.

11 Claims, 1 Drawing Sheet

(51) Int. Cl.
| | |
|---|---|
| *B01J 37/08* | (2006.01) |
| *B01J 27/053* | (2006.01) |
| *B01J 35/00* | (2006.01) |
| *B01J 37/02* | (2006.01) |
| *F01N 3/10* | (2006.01) |
| *B01J 35/04* | (2006.01) |
| *B01J 37/04* | (2006.01) |

(52) U.S. Cl.
CPC ......... *B01J 35/002* (2013.01); *B01J 35/0006* (2013.01); *B01J 35/0073* (2013.01); *B01J 37/0215* (2013.01); *B01J 37/0234* (2013.01); *B01J 37/0244* (2013.01); *B01J 37/08* (2013.01); *F01N 3/10* (2013.01); *F01N 3/101* (2013.01); *F01N 3/206* (2013.01); *B01D 2255/1023* (2013.01); *B01D 2255/1025* (2013.01); *B01D 2255/204* (2013.01); *B01D 2255/407* (2013.01); *B01D 2255/9022* (2013.01); *B01D 2258/014* (2013.01); *B01J 35/04* (2013.01); *B01J 37/0221* (2013.01); *B01J 37/04* (2013.01); *B01J 37/088* (2013.01); *B01J 2523/00* (2013.01); *F01N 2510/06* (2013.01)

(58) Field of Classification Search
CPC ........ F01N 3/10; F01N 3/206; F01N 2510/06; B01J 35/04; B01J 37/0244; B01J 35/0006; B01J 37/0234; B01J 37/0215; B01J 35/002; B01J 35/0073; B01J 27/053; B01J 37/08; B01J 2523/00; B01J 37/088; B01J 37/04
See application file for complete search history.

(56) References Cited

U.S. PATENT DOCUMENTS

| | | | | |
|---|---|---|---|---|
| 10,022,705 | B2* | 7/2018 | Kimura | ............... F01N 3/101 |
| 10,201,805 | B2* | 2/2019 | Ohashi | ............... B01J 23/63 |
| 2005/0129588 | A1* | 6/2005 | Nunan | ............... B01D 53/945 |
| | | | | 422/177 |
| 2005/0233897 | A1 | 10/2005 | Tanaka et al. | |
| 2005/0255993 | A1 | 11/2005 | Tanaka et al. | |
| 2005/0266986 | A1 | 12/2005 | Tanaka et al. | |
| 2008/0070776 | A1* | 3/2008 | Yamaguchi | ........ B01D 46/2429 |
| | | | | 502/100 |
| 2010/0212293 | A1* | 8/2010 | Deeba | ............... B01D 53/945 |
| | | | | 60/274 |
| 2012/0071318 | A1 | 3/2012 | Matsueda et al. | |
| 2012/0088655 | A1* | 4/2012 | Yabuzaki | ............ B01D 53/945 |
| | | | | 502/174 |
| 2012/0165185 | A1* | 6/2012 | Gramiccioni | ......... B01J 27/053 |
| | | | | 502/217 |
| 2014/0205523 | A1* | 7/2014 | Arnold | .................... B01J 23/63 |
| | | | | 423/213.5 |
| 2014/0329669 | A1 | 11/2014 | Fujimura et al. | |
| 2014/0369912 | A1* | 12/2014 | Zheng | ..................... B01J 23/63 |
| | | | | 423/213.5 |

FOREIGN PATENT DOCUMENTS

| | | |
|---|---|---|
| JP | H01-242149 A | 9/1989 |
| JP | H06-75675 B2 | 9/1994 |
| JP | H10-202101 A | 8/1998 |
| JP | 2004-041866 A | 2/2004 |
| JP | 2004-041867 A | 2/2004 |
| JP | 2004-041868 A | 2/2004 |
| JP | 2010-274162 A | 12/2010 |
| JP | 2015-085241 A | 5/2015 |
| WO | 2010/137658 A1 | 12/2010 |
| WO | 2013/111457 A1 | 8/2013 |

OTHER PUBLICATIONS

Jan. 30, 2018 International Preliminary Report on Patentability issued in International Patent Application No. PCT/JP2017/006934.
Oct. 24, 2019 extended European Search Report issued in European Patent Application No. 17759816.6.

* cited by examiner

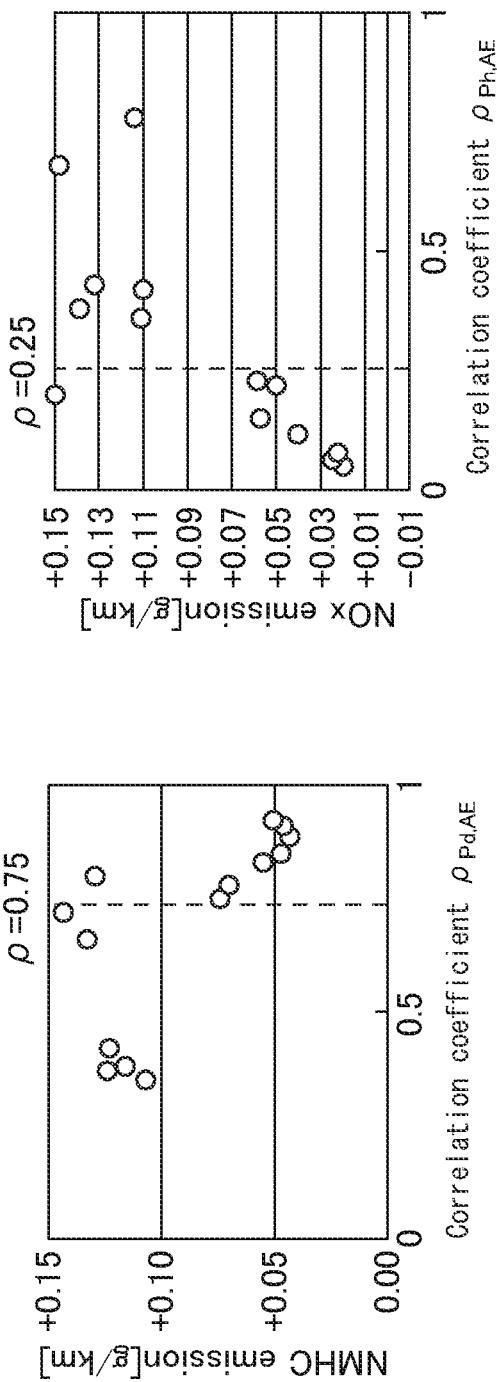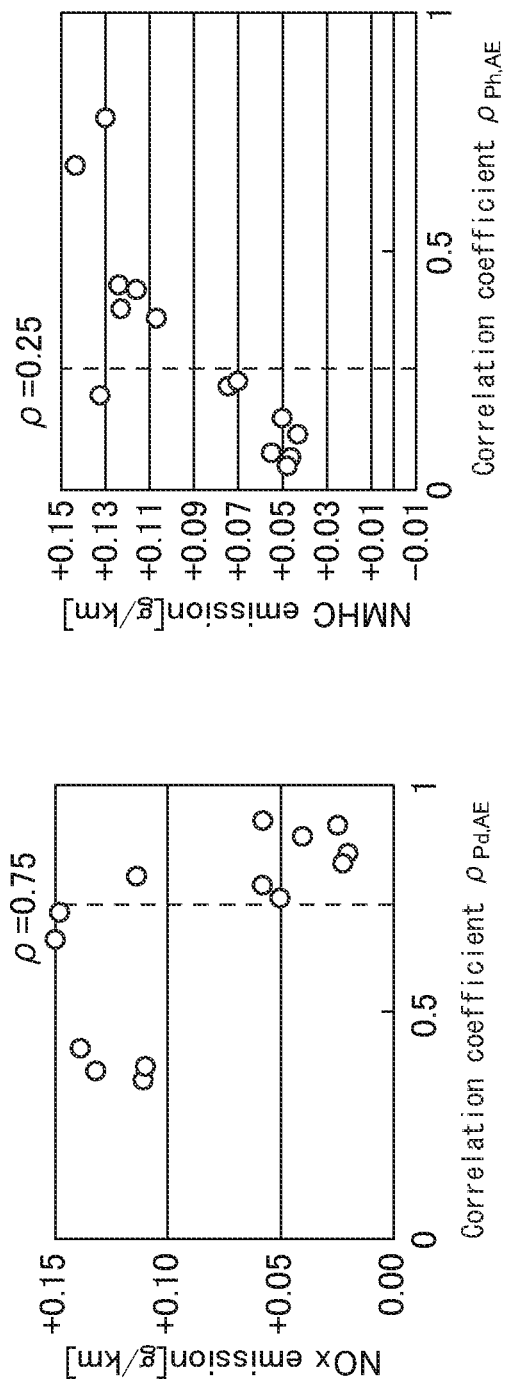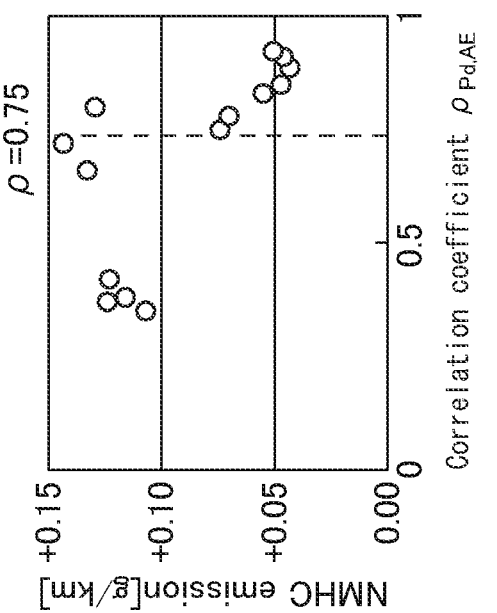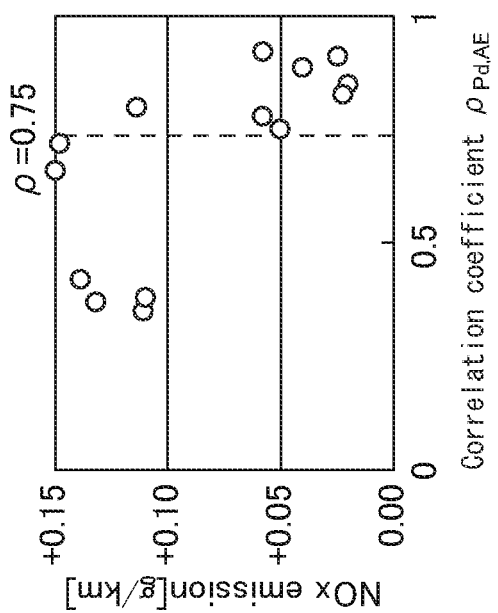

EXHAUST GAS PURIFICATION CATALYST

FIELD

The present invention relates to an exhaust gas purification catalyst.

BACKGROUND

Exhaust gas purification catalysts for treating exhaust gases from automobiles in which a noble metal is supported on or solid-dissolved in an inorganic oxide such as a cerium-based composite oxide, a zirconium-based composite oxide, or a perovskite-type composite oxide are known (Patent Literature 1 to 6). Such catalysts are widely used as catalysts capable of simultaneously removing hydrocarbons (HC), nitrogen oxides ($NO_X$), and carbon monoxide (CO).

The technology for suppressing the poisoning of noble metals (in particular, Pd) with hydrocarbons (HC) by including an alkaline-earth metal sulfate in these catalysts is known.

Conventionally, the catalyst layer in the exhaust gas purification catalyst as described above is formed on a substrate, for example, a cordierite honeycomb substrate, which itself has no exhaust gas purifying ability. However, in recent years, exhaust gas purification catalysts in which a noble metal is supported on a substrate composed of inorganic oxide particles has been proposed (Patent Literature 7).

CITATION LIST

Patent Literature

[PATENT LITERATURE 1] JPH 01-242149 A
[PATENT LITERATURE 2] JPH 06-75675 B
[PATENT LITERATURE 3] JPH 10-202101 A
[PATENT LITERATURE 4] JP No. 2004-041866 A
[PATENT LITERATURE 5] JP 2004-041867 A
[PATENT LITERATURE 6] JP 2004-041868 A
[PATENT LITERATURE 7] JP 2015-85241 A

SUMMARY

Technical Problem

When an alkaline-earth metal sulfate is included in an exhaust gas purification catalyst, the alkaline-earth metal sulfate functions as a component for suppressing HC poisoning of Pd, as described above. However, if Rh is additionally supported and included in the catalyst, the alkaline-earth metal sulfate acts on the Rh in the vicinity thereof, stabilizing the state of Rh oxide and impairing the $NO_X$ purification ability of the Rh metal.

The present invention has been conceived of in consideration of improving the above phenomenon. The present invention aims to provide an exhaust gas purification catalyst containing Pd and Rh as noble metals and an alkaline-earth metal sulfate in which the HC poisoning of Pd by the alkaline-earth metal sulfate can be effectively suppressed and the stabilization of the oxide state of the Rh by the alkaline-earth metal can be suppressed, whereby the catalytic activities of the Pd and Rh can be sustained for a long time.

Solution to Problem

In order to achieve the above-described objects, the present invention provides the following materials.

[1] An exhaust gas purification catalyst, comprising:
a catalyst layer comprising palladium, rhodium, and alumina, which supports an alkaline-earth metal sulfate selected from barium sulfate and strontium sulfate, wherein
when measuring the characteristic X-ray intensities of the palladium, rhodium, and alkaline-earth metal with an electron beam micro-analyzer using 350 points as measurement points obtained by equally dividing the catalyst layer into 351 parts in the thickness direction on a virtual straight line that runs through the catalyst layer in the thickness direction,
correlation coefficients $\rho_{Pd,AE}$ and $\rho_{Rh,AE}$, which are represented by Formula (1) below, are in the range of +0.75 to +1.00 and −1.00 to +0.25, respectively.

$$\rho_{M,AE} = \frac{C_{M,AE}}{\sigma_M \sigma_{AE}} \quad (1)$$

where M is Pd or Rh,
AE is the alkaline-earth metal, and
$C_{M,AE}$, $\sigma_M$, and $\sigma_{AE}$ are represented by Formulae (2) to (4) below;

$$C_{M,AE} = \frac{1}{350} \sum_{i=1}^{350} (I_{M,i} - I_{M,av})(I_{AE,i} - I_{AE,av}) \quad (2)$$

$$\sigma_M = \sqrt{\frac{1}{350} \sum_{i=1}^{350} (I_{M,i} - I_{M,av})^2} \quad (3)$$

$$\sigma_{AE} = \sqrt{\frac{1}{350} \sum_{i=1}^{350} (I_{AE,i} - I_{AE,av})^2} \quad (4)$$

where i is a natural number from 1 to 350,
$I_{M,i}$ is the characteristic X-ray intensity of M at the i-th measurement point,
$I_{M,av}$ is the arithmetic mean value of the characteristic X-ray intensity of M represented by Formula (5) below,
$I_{AE,i}$ is the characteristic X-ray intensity of the alkaline-earth metal at the i-th measurement point, and
$I_{AE,av}$ is the arithmetic mean value of the characteristic X-ray intensity of the alkaline-earth metal represented by Formula (6) below;

$$I_{M,av} = \frac{1}{350} \sum_{i=1}^{350} I_{M,i} \quad (5)$$

$$I_{AE,av} = \frac{1}{350} \sum_{i=1}^{350} I_{AE,i} \quad (6)$$

wherein when M is Pd, the above Formula is calculated using the characteristic X-ray intensity of palladium, and
when M is Rh, the above Formula is calculated using the characteristic X-ray intensity of rhodium.

[2] The exhaust gas purification catalyst according to [1], wherein the correlation coefficient $\rho_{Pd,AE}$ represented by Formula (1) above is in the range from +0.85 to +1.00.

[3] The exhaust gas purification catalyst according to [1] or [2], wherein the content of the alkaline-earth metal sulfate in the catalyst layer is 0.1 g/L to 80 g/L per unit volume of the substrate.

[4] The exhaust gas purification catalyst according to any one of [1] to [3], wherein the content of the alkaline-earth metal sulfate in the catalyst layer is from 0.1% by mass to 20% by mass based on the alumina, which supports an alkaline-earth metal sulfate.

[5] The exhaust gas purification catalyst according to any one of [1] to [4], wherein the mass ratio $S_{AE}/S_{Pd}$ of the alkaline-earth metal sulfate content $S_{AE}$ to the palladium content $S_{Pd}$ in the catalyst layer is from 0.1 to 80.

[6] The exhaust gas purification catalyst according to any one of [1] to [5], wherein the catalyst layer is formed on a substrate.

[7] The exhaust gas purification catalyst according to any one of [1] to [5], wherein the catalyst layer is a part of a substrate.

[8] The exhaust gas purification catalyst according to any one of [1] to [7], further comprising, in addition to the catalyst layer, a second catalyst layer containing palladium.

[9] A method for the production of the exhaust gas purification catalyst according to any one of [1] to [6] and [8], comprising the steps of:
  coating a substrate with a slurry containing a predetermined ratio of alumina, which supports an alkaline-earth metal sulfate and palladium,
  a rhodium precursor, and
  a carrier different from the alumina, which supports an alkaline-earth metal sulfate and palladium, and
  firing.

[10] A method for the production of the exhaust gas purification catalyst according to any one of [1] to [5], [7] and [8], comprising the step of:
  firing a raw material mixture comprising
  oxide particles containing alumina, which supports an alkaline-earth metal sulfate and palladium, and a carrier different from the alumina, which supports an alkaline-earth metal sulfate and palladium, and
  a rhodium precursor.

Advantageous Effects of Invention

According to the present invention, there is provided an exhaust gas purification catalyst in which the HC poisoning of Pd can be effectively suppressed and the stabilization of the oxide state of the Rh can be suppressed by the alkaline-earth metal sulfate, whereby the catalytic activities of the Pd and Rh can be sustained for a long time.

BRIEF DESCRIPTION OF DRAWINGS

FIG. 1 is a graph showing the relationships between the cold emission results and $\rho_{Pd,AE}$ and $\rho_{Rh,AE}$ in the Examples and Comparative Examples.

DESCRIPTION OF EMBODIMENTS

The exhaust gas purification catalyst of the present invention includes a support layer including palladium, rhodium, and alumina on which an alkaline-earth metal sulfate selected from barium sulfate and strontium sulfate is supported.

<Substrate>

The exhaust gas purification catalyst of the present invention may include a substrate. As the substrate, any substrate which is commonly used as the substrate of an exhaust gas purification catalyst for automobiles may be used. For example, a monolith honeycomb substrate or a metal substrate may be used. The volume of the substrate can be, for example, approximately 1 L.

For example, cordierite, SiC, stainless steel, or metal oxide particles can be used as the material of which the substrate is composed.

When the catalyst layer constitutes part of the substrate, the substrate may contain palladium, rhodium, or alumina on which an alkaline-earth metal sulfate selected from barium sulfate and strontium sulfate is supported.

<Catalyst Layer>

The catalyst layer of the exhaust gas purification catalyst of the present invention includes palladium (Pd), rhodium (Rh), and alumina on which an alkaline-earth metal (AE) sulfate selected from barium sulfate and strontium sulfate is supported.

The Pd, Rh, AE sulfate and alumina are all preferably in particle form. When each of these are in particle form, the preferable particle diameter ranges thereof are as follows.

Pd: preferably 1 to 20 nm, more preferably 1 to 15 nm, further preferably 1 to 10 nm, and particularly 1 to 5 nm;

Rh: preferably 1 to 20 nm, more preferably 1 to 15 nm, further preferably 1 to 10 nm, and particularly 1 to 5 nm;

AE sulfate: preferably 10 to 100 μm, more preferably 10 to 70 μm, further preferably 10 to 50 μm, and particularly 10 to 20 μm; and Alumina: preferably 5 to 80 μm, more preferably 10 to 60 μm, further preferably 15 to 55 μm, and particularly 20 to 45 μm.

Regarding the alumina, the specific surface area as measured by the BET technique using $N_2$ as the adsorbent is preferably 50 to 200 $m^2/g$, more preferably 70 to 180 $m^2/g$, further preferably 80 to 160 $m^2/g$, and particularly 90 to 120 $m^2/g$.

The content (support amount) of AE sulfate on the alumina on which the AE sulfate is supported is preferably 0.1% by mass to 20% by mass based on the mass of the alumina on which the AE sulfate (the total mass of the AE sulfate and the alumina) is supported from the viewpoint of effectively suppressing the HC poisoning of Pd and reducing the likelihood of stabilizing the oxidation state of the Rh by interaction with Rh. The support amount of AE sulfate is more preferably 1% by mass to 18% by mass, further preferably 3% by mass to 16% by mass, particularly preferably 5% by mass to 14% by mass, and especially preferably 8% by mass to 12% by mass on the above-described basis.

The Pd and Rh are each preferably supported on a suitable carrier. The Pd and Rh may each be supported together with the AE sulfate on the alumina on which the AE sulfate is supported or may each be supported on a carrier separate from the alumina on which the AE sulfate is supported. In this case, other than the palladium, rhodium and alumina on which an alkaline-earth metal sulfate selected from barium sulfate and strontium sulfate is supported, the catalyst layer may include the carrier separate from the alumina on which the AE sulfate is supported.

As the separate carrier, a metal oxide can be suitably used. Specifically, for example, alumina, CZ (ceria-zirconia composite oxide), zeolite, and mixtures thereof can be used. The preferable particle sizes and BET specific surface areas of these carriers are as follows.

Particle diameter: preferably 5 μm to 50 μm, and more preferably 1 μm to 30 μm as measured by X-ray diffraction (XRD).

BET specific surface area: preferably 50 $m^2/g$ to 200 $m^2/g$, and more preferably 80 $m^2/g$ to 125 $m^2/g$ using $N_2$ as the adsorbent.

It is preferable to use one or more selected from alumina and CZ as the carrier particles. In order to satisfy the correlation coefficient $\rho_{Pd,AE}$ of Pd and AE and the correlation coefficient $\rho_{Rh,AE}$ of Rh and AE described above, the Pd is preferably supported with the AE on the alumina on which the AE sulfate is supported and the Rh is preferably supported on a carrier separate from the alumina on which the AE sulfate is supported. In this case, it is particularly preferable that the Rh be supported on CZ from the viewpoint of maintaining the $NO_X$ removal performance for a long time.

The support amount of the Pd is preferably 0.5% by mass to 15.0% by mass based on the total mass of the Pd and the carrier, in order to obtain a high HC removal efficiency while suppressing HC poisoning of the Pd. The support amount of the Pd is more preferably 2.0% by mass to 10.0% by mass, and further preferably 5.0% by mass to 8.0% by mass on the above-described basis.

It is preferable that the mass ratio $S_{AE}/S_{Pd}$ of the Pd content $S_{Pd}$ and the AE sulfate content $S_{AE}$ included in the catalyst layer of the exhaust gas purification catalyst of the present invention be in the range of 0.1 to 80 from the viewpoint of maintaining a high HC removal performance for a long time. This value is more preferably 0.5 to 10.0, and further preferably 0.5 to 0.7.

The support amount of Rh is preferably 0.5% by mass to 15.0% by mass based on the total mass of the Rh and the carrier, in order to obtain a high HC removal efficiency while suppressing HC poisoning of the Pd. The support amount of the Pd is more preferably 2.0% by mass to 10.0% by mass, and further preferably 5.0% by mass to 8.0% by mass on the above-described basis.

The present invention focuses on the concentration distribution of the Pd, Rh, and AE in the catalyst layer of the exhaust gas purification catalyst and clarifies that when the correlation of the concentration distribution of the Pd and AE in the thickness direction of the catalyst layer is high and the correlation of the concentration distribution of the Rh and AE in the same direction is low, the HC and $NO_X$ removal performance is excellent. By making the concentration correlation between Pd and AE high, the probability that AE exists in the vicinity of the Pd is high. As a result, the suppression effect of the AE on HC poisoning of the Pd is effectively exhibited and high HC removal performance is maintained. Conversely, by making the concentration correlation between Rh and AE low, the probability that AE exists in the vicinity of the Rh is low. As a result, the stabilization of the oxidation state of the Rh by the AE can be suppressed and the $NO_X$ removal performance of the Rh is maintained for a long time.

The above-described concentration correlations are quantitatively measured with an electron beam micro-analyzer. The specific measuring process can be as follows.

First, a straight line penetrating the catalyst layer in the thickness direction is assumed. Next, on this virtual straight line, 350 points equally dividing the catalyst layer into 351 parts in the thickness direction are set as measurement points. For these measurement points, the characteristic X-ray intensities of Pd, Rh, and AE are measured with an electron beam micro-analyzer. Thereafter, the correlation coefficient $\rho_{Pd,AE}$ of Pd and AE and the correlation coefficient $\rho_{Rh,AE}$ of Rh and AE are determined by the following formula (1).

$$\rho_{M,AE} = \frac{C_{M,AE}}{\sigma_M \sigma_{AE}} \quad (1)$$

where M is Pd or Rh,
AE is the alkaline-earth metal, and
$C_{M,AE}$, $\sigma_M$, and $\sigma_{AE}$ are represented by Formulae (2) to (4) below;

$$C_{M,AE} = \frac{1}{350}\sum_{i=1}^{350}(I_{M,i} - I_{M,av})(I_{AE,i} - I_{AE,av}) \quad (2)$$

$$\sigma_M = \sqrt{\frac{1}{350}\sum_{i=1}^{350}(I_{M,i} - I_{M,av})^2} \quad (3)$$

$$\sigma_{AE} = \sqrt{\frac{1}{350}\sum_{i=1}^{350}(I_{AE,i} - I_{AE,av})^2} \quad (4)$$

where i is a natural number from 1 to 350,
$I_{M,i}$ is the characteristic X-ray intensity of M at the i-th measurement point,
$I_{M,av}$ is the arithmetic mean value of the characteristic X-ray intensity of M represented by Formula (5) below,
$I_{AE,i}$ is the characteristic X-ray intensity of the alkaline-earth metal at the i-th measurement point, and
$I_{AE,av}$ is the arithmetic mean value of the characteristic X-ray intensity of the alkaline-earth metal represented by Formula (6) below;

$$I_{M,av} = \frac{1}{350}\sum_{i=1}^{350} I_{M,i} \quad (5)$$

$$I_{AE,av} = \frac{1}{350}\sum_{i=1}^{350} I_{AE,i} \quad (6)$$

wherein when M is Pd, the above formula is calculated using the characteristic X-ray intensity of palladium, and when M is Rh, the above formula is calculated using the characteristic X-ray intensity of rhodium.

In the present invention, it is necessary that the correlation coefficient $\rho_{Pd,AE}$ of Pd and AE be +0.75 to +1.00 and the correlation coefficient $\rho_{Rh,AE}$ of Rh and AE be −1.00 to +0.25 calculated as described above. By adjusting the correlation coefficients to within the above ranges, the effect of the present invention of suppressing the stabilization of the Rh oxidation state satisfactorily while suppressing the HC poisoning of the Pd can be exhibited. $\rho_{Pd,AE}$ is preferably +0.80 to +1.00, more preferably +0.85 to +1.00, and further preferably +0.90 to +1.00. $\rho_{Rh,AE}$ is preferably −0.50 to +0.25, more preferably −0.25 to +0.20, and further preferably 0.00 to +0.10.

When a substrate is included in the exhaust gas purification catalyst of the present invention, the amount of the catalyst layer is preferably 10 g/L to 1,000 g/L, more preferably 50 g/L to 750 g/L, further preferably 75 g/L to 500 g/L, and particularly 100 g/L to 450 g/L as the catalyst layer mass per 1 L of the substrate volume.

When a substrate is included in the exhaust gas purification catalyst of the present invention, the content of AE sulfate in the above-described catalyst layer is preferably adjusted to 0.1 g/L to 80 g/L per 1 L of substrate volume, whereby the HC poisoning of the Pd is effectively suppressed and stabilization of the oxide state of the Rh is suppressed, and the catalytic activity of both the Pd and the Rh can be sustained for a long time. This value is more preferably 10 g/L to 60 g/L, further preferably 3 g/L to 40 g/L, particularly 5 g/L to 20 g/L, and especially preferably 7.5 g/L to 15 g/L.

<Production of the Exhaust Gas Purification Catalyst>

The exhaust gas purification catalyst of the present invention can be produced by any method as long as a catalyst layer as described above is included. Any of the following production methods can be used.

[First Production Method]

A preferable method for producing the exhaust gas purification catalyst of the present invention includes, for example, a method comprising the steps of:

coating a substrate with a slurry containing a predetermined ratio of alumina, which supports the AE sulfate and the Pd, a Rh precursor, and a carrier different from the alumina which supports the AE sulfate and the Pd, and firing.

[Second Production Method]

The method comprises the step of:

firing a raw material mixture comprising oxide particles containing alumina, which supports an alkaline-earth metal sulfate and palladium, and a carrier different from the alumina, which supports an alkaline-earth metal sulfate and palladium, and a rhodium precursor.

CZ is preferably used as the carrier different from the above-described alumina on which the AE sulfate and the Pd are supported.

According to the first production method of the present invention, an exhaust gas purification catalyst including a catalyst layer on a substrate can be obtained. According to the second production method of the present invention, an exhaust gas purification catalyst in which a part of the substrate is composed of the catalyst layer can be obtained. The above-described first and second production methods will be described in order below.

1. First Production Method

As the substrate in the first manufacturing method of the present invention, it is possible to select and use a desired substrate for the exhaust gas purification catalyst. For example, a monolithic honeycomb substrate composed of cordierite or metal oxide particles, as described above.

The slurry used to coat the catalyst layer on the substrate as described above includes oxide particles containing alumina, which supports the alkaline-earth metal sulfate and the Pd, and a carrier different from the alumina which supports the alkaline-earth metal sulfate and the Pd, and the Rh precursor. The dispersion medium of the slurry is preferably water.

The above-described alumina on which the AE sulfate and Pd are supported can be obtained by, for example, mixing an aqueous solution in which the AE sulfate and the Pd precursor are dissolved in water and the alumina at a predetermined ratio, recovering the insoluble matter, and drying the insoluble matter. A water-soluble Pd salt is preferably used as the Pd precursor. Specifically, for example, palladium nitrate, palladium chloride, or palladium sulfate may be used. From the viewpoint of solubility in a solvent, palladium nitrite is preferable.

A water-soluble Rh salt is preferably used as the Rh precursor. Specifically, for example, rhodium chloride, sodium rhodium chloride, rhodium chloride pentaamine, or carbonyl acetyl rhodium may be used. From the viewpoint of water-solubility, rhodium chloride is preferable.

The coating method is not limited and, for example, any known method, such as a dipping method, a pouring method, or a push-up coating method, can be used. After applying the slurry, a process for removing the solvent may be carried out. This process can be a heating method carried out at a temperature of, for example 60 to 300° C., preferably 120 to 250° C., for, for example, 5 to 120 minutes, preferably 10 to 60 minutes.

The heating temperature of the firing can be, for example, greater than 300° C. to 1,000° C., preferably 400° C. to 1,000° C. The heating time can be, for example, 0.1 to 10 hours, preferably 0.5 to 5 hours.

2. Second Production Method

The second production method of the present invention can be carried out in accordance with, for example the method described in Patent Literature 7 using, as a part or all of the metal oxide particles constituting the substrate, oxide particles including the alumina on which the alkaline-earth metal sulfate and the Pd are supported, a carrier different from the alumina on which the alkaline-earth metal sulfate and the Pd are supported, and the Rh precursor as raw materials.

When the catalyst layer constitutes a part of the substrate, specifically, the substrate can be obtained by, for example, firing a raw material mixture obtained by mixing the oxide particles containing the predetermined alumina on which the alkaline-earth metal sulfate and the Pd are supported of the present invention as well as the carrier different from the alumina on which the alkaline-earth metal sulfate and the Pd are supported, and adding water and a binder thereto. The raw material mixture may be extruded into a predetermined shape after being kneaded and may be dried prior to firing.

<Exhaust Gas Purification Catalyst>

The exhaust gas purification catalyst of the present invention includes a catalyst layer as described above. The catalyst layer may be single-layered or may be multi-layered.

When the exhaust gas purification catalyst of the present invention has a substrate different from the predetermined catalyst layer of the present invention, the catalyst may be composed only of the above-mentioned base material and single- or multi-layered catalyst layer (first catalyst layer) or, additionally, may further include another catalyst layer (second catalyst layer) not corresponding to the first catalyst layer. In the exhaust gas purification catalyst of the present invention, the order of the first catalyst layer and this second catalyst layer is arbitrary. For example, the following three configurations can be used.

(1) A configuration in which the first catalyst layer is arranged on the substrate in contact with the substrate and the second catalyst layer is arranged on the first catalyst layer in contact with the first catalyst layer.

(2) A configuration in which the second catalyst layer is arranged on the substrate in contact with the substrate and the first catalyst layer is arranged on the second catalyst layer in contact with the second catalyst layer. It is clear for a person skilled in the art that the catalyst of this configuration can be produced by the same method as the first production method described above by replacing "substrate" with "substrate including the second catalyst layer".

(3) A configuration in which the second catalyst layer constitutes a part of the substrate and the first catalyst layer is arranged in contact with the substrate. It is clear for a person skilled in the art that the catalyst of this configuration can be produced by the same method as the first production method described above by replacing "substrate" with "substrate in which the second catalyst layer constitutes a part of the substrate".

The second catalyst layer is preferably a catalyst layer containing Pd. However, when the catalyst layer containing the Pd corresponds to the predetermined catalyst layer of the present invention (the first catalyst layer), it is excluded from the second catalyst layer.

The Pd in the second catalyst layer is preferably supported and included in an appropriate carrier. In this case, for example, alumina, CZ (ceria/zirconia composite oxide), zeolite or combinations thereof may be used as the carrier. The use of a combination of alumina and CZ is particularly preferable.

When the exhaust gas purification catalyst of the present invention includes a substrate different than the second catalyst layer, the amount of the second catalyst layer in the exhaust gas purification catalyst of the present invention is preferably 10 g/L to 500 g/L, more preferably 50 g/L to 400 g/L, further preferably 75 g/L to 300 g/L and particularly preferably 100 g/L to 200 g/L as the mass of the catalyst layer per 1 L of the substrate volume.

The above-described second catalyst layer may be a catalyst layer having a known configuration.

The second catalyst layer, which is the substrate or a coating layer formed on the substrate including the first catalyst layer, can be formed by a known method, for example, a coating method using a slurry including, for example, the desired metal oxide and the Pd precursor, and if necessary, further including a binder.

The substrate, a part of which is constituted by the second catalyst layer, can be obtained by, for example, firing a raw material mixture including the desired metal oxide and the Pd precursor, and if necessary, further including a binder. The raw material mixture may be extruded into a predetermined shape after being kneaded and may be dried prior to firing.

In the exhaust gas purification catalyst of the present invention produced as described above, the HC poisoning of Pd can be effectively suppressed, the stabilization of the oxidation state of Rh can be suppressed, and the catalytic activity of both the Pd and the Rh can be sustained for a long time. The exhaust gas purification catalyst of the present invention can be preferably used as an exhaust gas purification catalyst for automobiles.

EXAMPLES

In the following Examples and Comparative Examples, a monolith honeycomb substrate having a total length of 100 mm, a volume of 1.0 L, and a cell number of 900 cells/in$^2$ was used as the substrate;

alumina particles having an average particle diameter of 30 μm and a BET specific surface area of 150 m$^2$/g were used as the alumina; and particles having a Ce:Zr ratio of 7:3 (oxide-basis mass ratio), an average particle diameter of 3 μm, and a BET specific surface area of 80 m$^2$/g were used as the cerium/zirconium composite oxide.

Example 1

Alumina, 0.1% by mass equiv. of barium sulfate with respect to the alumina, and an aqueous solution containing palladium nitrate at an amount equivalent to 1.0 g of the Pd metal per the formed catalyst layer were mixed and dried to obtain an alumina (Ba—Pd/Al$_2$O$_3$) on which barium sulfate and Pd are supported.

100 g of a cerium-zirconium composite oxide (CZ) and an aqueous solution containing rhodium nitrate at an amount equivalent to 1.0 g of the Rh metal per the formed catalyst layer were mixed and 100 g of the above-described Ba—Pd/Al$_2$O$_3$ was further added thereto to obtain a slurry.

The above-described slurry was applied onto a monolith honeycomb substrate, dried at 250° C. for 1 hour, and fired at 500° C. for 1 hour to prepare a catalyst including a coating amount of 201.0 g of the catalyst layer on the substrate.

Examples 2 to 4 and Comparative Examples 1 and 2

The catalysts were prepared in the same manner as Example 1 except that the support amount of the barium sulfate and the Pd in the Ba—Pd/Al$_2$O$_3$, the amount of the Ba—Pd/Al$_2$O$_3$ used, and the coating amount of the catalyst layer were as described in Table 1.

Comparative Example 3

89 g of alumina, palladium nitrate at an amount equivalent to 1% by mass of the Pd metal, 100 g of CZ, an aqueous solution containing rhodium nitrate at an amount equivalent to 1.0 g of the Rh metal, and 10% by mass equiv. of barium sulfate were mixed in the order described above to obtain a slurry. A catalyst was prepared in the same manner as Example 1 except that this slurry was used.

Comparative Example 4

100 g of Ba—Pd/Al$_2$O$_3$ prepared in the same manner as Example 1, 100 g of CZ, 10 g of barium sulfate, and an aqueous solution including rhodium nitrate at an amount equivalent to 1.0 g of the Rh metal per the formed catalyst layer were mixed in this order to obtain a slurry. A catalyst was prepared in the same manner as Example 1 except this slurry was used.

TABLE 1

Preparation of Catalyst Including Single-Layer Catalyst Layer

| | CZ | Rh Nitrate | Ba—Pd/Al$_2$O$_3$ | | | Catalyst Layer |
|---|---|---|---|---|---|---|
| | Amount Used (g) | (g-Rh/Catalyst Layer) | Ba Sulfate (wt %/Al$_2$O$_3$) | Pd Nitrate (g-Pd/Catalyst Layer) | Amount Used (g) | Coating Amount (g/Substrate) |
| Example 1 | 100 | 1.0 | 0.1 | 1.0 | 100 | 201.0 |
| Example 2 | 100 | 1.0 | 10 | 1.0 | 100 | 201.0 |
| Example 3 | 100 | 1.0 | 20 | 1.0 | 100 | 201.0 |
| Example 4 | 50 | 1.0 | 20 | 1.0 | 400 | 451.0 |
| Comparative Example 1 | 100 | 1.0 | 0.05 | 1.0 | 100 | 201.0 |
| Comparative Example 2 | 50 | 1.0 | 21 | 1.0 | 400 | 451.0 |
| Comparative Example 3[*] | (100) | (1.0) | (10 g) | (1.0) | (89) | 201.0 |
| Comparative Example 4[] | 100 | 1.0 | 10 wt % + 10 g[] | 1.0 | 100 | 201.0 |

[*]Comparative Example 3 was prepared by physically mixing each component
[**]10 g of barium sulfate was physically mixed in Comparative Example 4

Example 5

A catalyst layer (first catalyst layer) having a coating amount of 101.0 g was formed on a substrate in the same manner as Example 1 except that, as the Ba—Pd/Al$_2$O$_3$, 50 g of alumina on which 10% by mass of the barium sulfate and 0.5 g equiv. of Pd per coating layer was used, and the amount of CZ used was 50 g.

Separately, 50 g of alumina, 50 g of CZ, and an aqueous solution including palladium nitrate at an amount equivalent to 0.5 g of Pd metal per the formed catalyst layer were mixed to obtain a slurry for the second catalyst layer.

The slurry for the second catalyst layer described above was applied onto a substrate formed from the above-described first catalyst layer, dried at 250° C. for 1 hour, and fired at 500° C. for 1 hour to prepare a catalyst further including a second catalyst layer at a coating amount of 100.5 g on the first catalyst layer.

Example 6

The catalyst was prepared in the same manner as Example 5 except that coating order of the first catalyst layer and the second catalyst layer were reversed.

Example 7 and Comparative Example 5

The catalysts were prepared in the same manner as Example 5 except that the types and amounts of each component used when preparing the slurry were as described in Table 2.

Comparative Example 6

44.5 g of alumina, 50 g of CZ, 5 g of barium sulfate, an aqueous solution including palladium nitrite at an amount equivalent to 0.5% by mass of Pd metal per the formed catalyst layer, and an aqueous solution including rhodium nitrate at an amount equivalent to 1.0 g of the Rh metal were mixed to obtain a slurry. The catalyst was prepared in the same manner as example 5, except that this slurry was used as the slurry for the first catalyst layer.

Comparative Example 7

The catalyst was prepared in the same manner as Comparative Example 6 described above except that the coating order of the first catalyst layer and the second catalyst layer were reversed.

TABLE 2

| | Preparation of Catalysts Having Two-Layered Catalyst Layers | | | | | | | | | | |
|---|---|---|---|---|---|---|---|---|---|---|---|
| | First Catalyst Layer | | | | | | | Second Catalyst Layer | | | |
| | AE-Pd/Al$_2$O$_3$ | | | | | | | | | | |
| | | Rh | Alkaline-Earth Metal Sulfate | | Pd | | Catalyst Layer | | Pd | | Catalyst Layer |
| | CZ Amount Used (g) | Nitrate (g-RH/ Catalyst Layer) | Type | Amount Used (wt %/ Al$_2$O$_3$) | Nitrate (g-Pd/ Catalyst Layer) | Amount Used (g) | Coating Amount (g/ Substrate) | Al$_2$O$_3$ Amount Used (g) | CZ Amount Used (g) | Nitrate (g-Pd/ Catalyst Layer) | Coating Amount (g/ Substrate) | Coating Order |
| Example 5 | 50 | 1.0 | Ba Sulphate | 10 | 0.5 | 50 | 101.0 | 50 | 50 | 0.5 | 100.5 | Substrate, 1st Layer, 2nd Layer |
| Example 6 | 50 | 1.0 | Ba Sulphate | 10 | 0.5 | 50 | 101.0 | 50 | 50 | 0.5 | 100.5 | Substrate, 2nd Layer, 1st Layer |
| Example 7 | 50 | 1.0 | Sr Sulphate | 10 | 0.5 | 50 | 101.0 | 50 | 50 | 0.5 | 100.5 | Substrate, 1st Layer, 2nd Layer |
| Comparative Example 5 | 50 | 1.0 | Ba Acetate | 10 | 0.5 | 50 | 101.0 | 50 | 50 | 0.5 | 100.5 | Substrate, 1st Layer, 2nd Layer |
| Comparative Example 6[*] | (50) | (1.0) | Ba Sulphate | (5 g) | (0.5) | (44.5) | 101.0 | 50 | 50 | 0.5 | 100.5 | Substrate, 1st Layer, 2nd Layer |
| Comparative Example 7[*] | (50) | (1.0) | Ba Sulphate | (5 g) | (0.5) | (44.5) | 101.0 | 50 | 50 | 0.5 | 100.5 | Substrate, 2nd Layer, 1st Layer |

[*]The slurry for the first catalyst layer of Comparative Examples 6 and 7 was prepared by physically mixing each component <Calculation of Correlation Coefficients>

Regarding the first catalyst layers of the catalysts prepared in the Examples and Comparative Examples, Table 3 shows the values of the correlation coefficients $\rho_{Pd,AE}$ and $\rho_{Rh,AE}$ calculated from the characteristic X-ray intensity of each element measured using an electron beam microanalyzer manufacture by JEOL, model "Hyper Probe JXA-8530F" at an acceleration voltage of 20 kV.

<Durability Performance Evaluation>

The catalysts prepared in the Examples and Comparative Examples were subjected to endurance treatment equivalent to 100,000 km and were mounted on a real vehicle equipped with a 1.6-liter engine, and cold emissions of non-methane hydrocarbons (NMHC) and nitrogen oxides (NO$_X$) were measured during running in NEDC mode. The measurement results are shown in Table 3. A graph showing the relationship between the correlation coefficients $\rho_{Pd,AE}$ and $\rho_{Rh,AE}$ and cold emissions of non-methane hydrocarbons (NMHC) and nitrogen oxides (NO$_X$) is shown in FIG. 1.

$$\rho_{M,AE} = \frac{C_{M,AE}}{\sigma_M \sigma_{AE}} \quad (1)$$

where M is Pd or Rh,

AE is the alkaline-earth metal, and $C_{M,AE}$, $\sigma_M$, and $\sigma_{AE}$ are represented by Formulae (2) to (4) below;

$$C_{M,AE} = \frac{1}{350}\sum_{i=1}^{350}(I_{M,i} - I_{M,av})(I_{AE,i} - I_{AE,av}) \quad (2)$$

$$\sigma_M = \sqrt{\frac{1}{350}\sum_{i=1}^{350}(I_{M,i} - I_{M,av})^2} \quad (3)$$

TABLE 3

Evaluation Results

| | First Catalyst Layer | | | | | | | |
|---|---|---|---|---|---|---|---|---|
| | Noble Metal Loading Amount (g/L) | | Correlation Coefficient | | Coating | Second Catalyst Layer Coating | Cold Emission (g/km) | |
| | Pd | Rh | $\rho_{Pd,AE}$ | $\rho_{Rh,AE}$ | Amount (g) | Amount (g) | NMHC | NO$_x$ |
| Example 1 | 1.0 | 1.0 | +0.75 | +0.22 | 201.0 | — | 0.074 | 0.050 |
| Example 2 | 1.0 | 1.0 | +0.89 | +0.12 | 201.0 | — | 0.043 | 0.040 |
| Example 3 | 1.0 | 1.0 | +0.92 | +0.15 | 201.0 | — | 0.050 | 0.057 |
| Example 4 | 1.0 | 1.0 | +0.78 | +0.23 | 451.0 | — | 0.070 | 0.058 |
| Comparative Example 1 | 1.0 | 1.0 | +0.66 | +0.20 | 201.0 | — | 0.133 | 0.150 |
| Comparative Example 2 | 1.0 | 1.0 | +0.72 | +0.68 | 451.0 | — | 0.144 | 0.148 |
| Comparative Example 3 | 1.0 | 1.0 | +0.42 | +0.38 | 201.0 | — | 0.123 | 0.139 |
| Comparative Example 4 | 1.0 | 1.0 | +0.80 | +0.78 | 201.0 | — | 0.130 | 0.114 |
| Example 5 | 1.0 | 1.0 | +0.85 | +0.05 | 101.0 | 100.5 | 0.047 | 0.020 |
| Example 6 | 1.0 | 1.0 | +0.91 | +0.07 | 101.0 | 100.5 | 0.046 | 0.024 |
| Example 7 | 1.0 | 1.0 | +0.83 | +0.08 | 101.0 | 100.5 | 0.055 | 0.022 |
| Comparative Example 5 | 1.0 | 1.0 | +0.37 | +0.43 | 101.0 | 100.5 | 0.124 | 0.132 |
| Comparative Example 6 | 1.0 | 1.0 | +0.35 | +0.36 | 101.0 | 100.5 | 0.107 | 0.111 |
| Comparative Example 7 | 1.0 | 1.0 | +0.38 | +0.42 | 101.0 | 100.5 | 0.116 | 0.110 |

The invention claimed is:

1. An exhaust gas purification catalyst, comprising:

a catalyst layer comprising palladium (Pd), rhodium (Rh), and alumina, the alumina supports an alkaline-earth metal sulfate selected from barium sulfate and strontium sulfate, wherein when measuring characteristic X-ray intensities of the palladium, rhodium, and alkaline-earth metal with an electron beam micro-analyzer using 350 points as measurement points obtained by equally dividing the catalyst layer into 351 parts in a thickness direction on a virtual straight line that runs through the catalyst layer in the thickness direction, correlation coefficients $\rho_{Pd,AE}$ and $\rho_{Rh,AE}$, which are represented by Formula (1) below, are in a range of +0.75 to +1.00 and −1.00 to +0.25, respectively, -continued $$\sigma_{AE} = \sqrt{\frac{1}{350}\sum_{i=1}^{350}(I_{AE,i} - I_{AE,av})^2} \quad (4)$$

where i is a natural number from 1 to 350, $I_{M,i}$ is the characteristic X-ray intensity of M at an i-th measurement point, $I_{M,av}$ is an arithmetic mean value of the characteristic X-ray intensity of M represented by Formula (5) below, $I_{AE,i}$ is the characteristic X-ray intensity of the alkaline-earth metal at an i-th measurement point, and $I_{AE,av}$ is an arithmetic mean value of the characteristic X-ray intensity of the alkaline-earth metal represented by Formula (6) below;

$$I_{M,av} = \frac{1}{350}\sum_{i=1}^{350} I_{M,i} \qquad (5)$$

$$I_{AE,av} = \frac{1}{350}\sum_{i=1}^{350} I_{AE,i} \qquad (6)$$

wherein when M is Pd, the above Formulas (1), (2), (3), and (5) are calculated using the characteristic X-ray intensity of palladium, and when M is Rh, the above Formulas (1), (2), (3), and (5) are calculated using the characteristic X-ray intensity of rhodium.

2. The exhaust gas purification catalyst according to claim 1, wherein the correlation coefficient $\rho_{Pd,AE}$ represented by Formula (1) above is in the range from +0.85 to +1.00.

3. The exhaust gas purification catalyst according to claim 1, wherein a content of the alkaline-earth metal sulfate in the catalyst layer is from 0.1% by mass to 20% by mass based on the alumina, which supports an alkaline-earth metal sulfate.

4. The exhaust gas purification catalyst according to claim 1, wherein the mass ratio $S_{AE}/S_{Pd}$ of the alkaline-earth metal sulfate content $S_{AE}$ to the palladium content $S_{Pd}$ in the catalyst layer is from 0.1 to 80.

5. The exhaust gas purification catalyst according to claim 1, wherein the catalyst layer is formed on a substrate.

6. A method for the production of the exhaust gas purification catalyst according to claim 5, comprising:
preparing a slurry containing a predetermined ratio of alumina, which supports the alkaline-earth metal sulfate and palladium,
a rhodium precursor, and
a carrier different from the alumina, the alumina supporting the alkaline-earth metal sulfate and palladium;
coating the substrate with the slurry; and
firing the substrate which is coated with the slurry.

7. The exhaust gas purification catalyst according to claim 5, wherein a content of the alkaline-earth metal sulfate in the catalyst layer is 0.1 g/L to 80 g/L per unit volume of the substrate.

8. The exhaust gas purification catalyst according to claim 1, wherein the catalyst layer is a part of a substrate.

9. A method for the production of the exhaust gas purification catalyst according to claim 8, comprising:
preparing a raw material mixture comprising
oxide particles containing alumina, said alumina supporting the alkaline-earth metal sulfate and palladium,
a carrier different from the alumina, said alumina supporting the alkaline-earth metal sulfate and palladium, and
a rhodium precursor; and
firing the raw material mixture.

10. The exhaust gas purification catalyst according to claim 8, wherein a content of the alkaline-earth metal sulfate in the catalyst layer is 0.1 g/L to 80 g/L per unit volume of the substrate.

11. The exhaust gas purification catalyst according to claim 1, further comprising, in addition to the catalyst layer, a second catalyst layer containing palladium.

* * * * *